Dec. 13, 1932.  T. R. HARRISON  1,891,154
MANOMETER
Filed Aug. 10, 1926
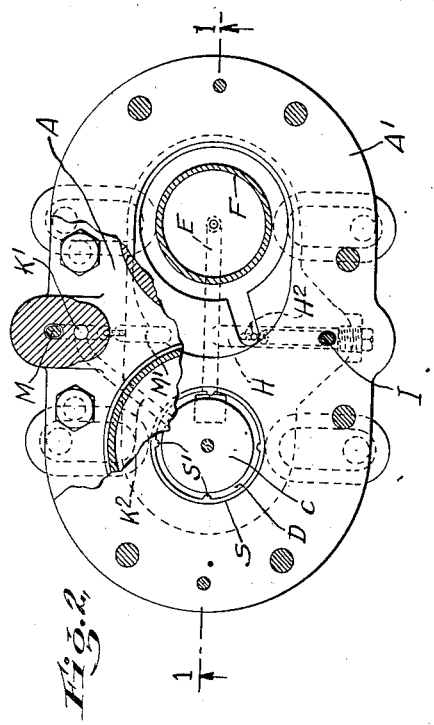
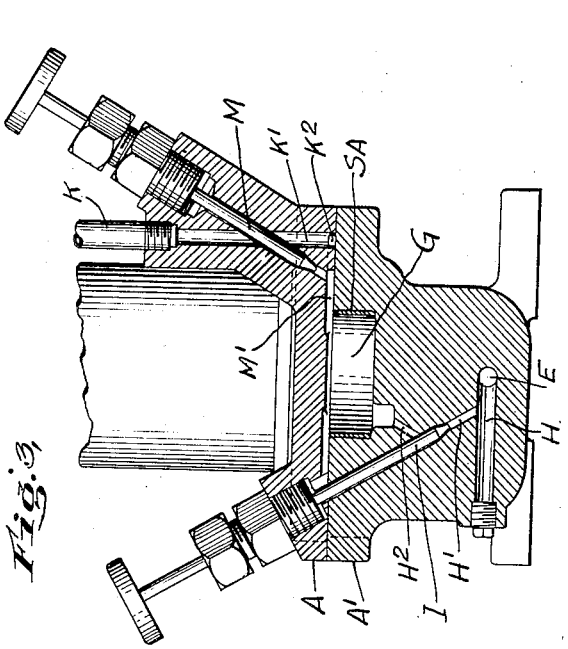
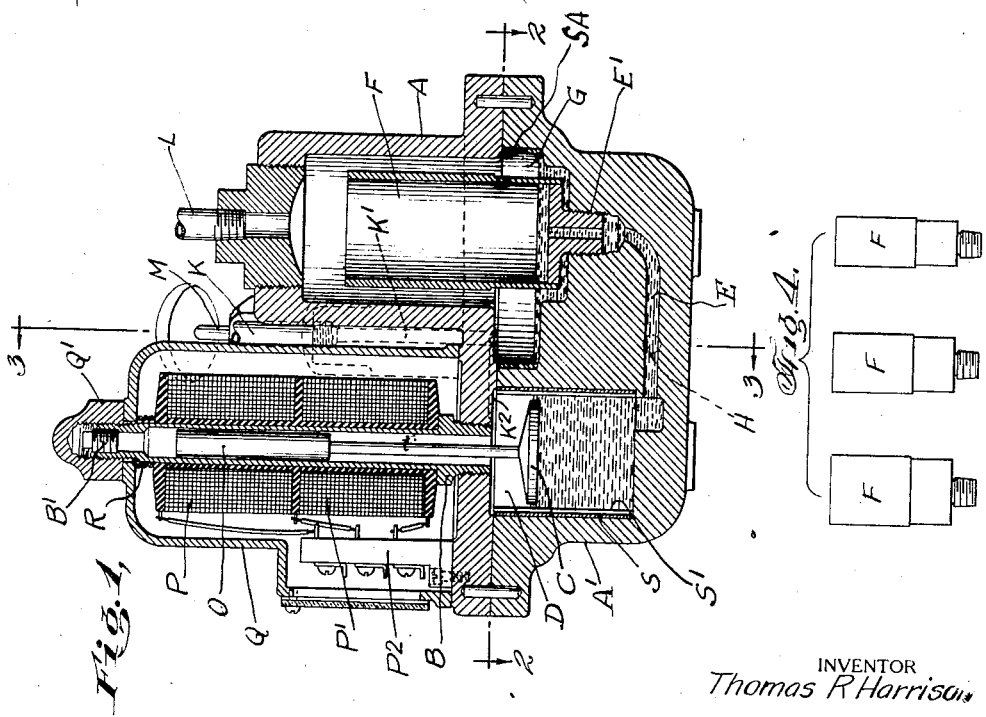
INVENTOR
Thomas R Harrison
BY
John E. Hubbell
ATTORNEY Patented Dec. 13, 1932

1,891,154

UNITED STATES PATENT OFFICE

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

MANOMETER

Application filed August 10, 1926. Serial No. 128,466.

The general object of the present invention is to provide a manometer characterized by its mechanical simplicity, rugged character and durability, and by the comparative ease with which it can be constructed with the precision necessary for its use as a part of a flow meter, though certain features of the invention are not restricted to use in a flow meter manometer. More specific objects of the invention are to provide a manometer with simple and effective means for varying the relation between the pressure differential impressed on the manometer and the resultant change in sealing liquid level in one of the legs of the manometer. Another specific object of the invention is to provide the manometer with novel and effective means facilitating the charging and calibration of the manometer.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of my invention.

Of the drawing:

Fig. 1 is a sectional elevation taken on the line 1—1 of Fig. 2;

Fig. 2 is a plan view with parts broken away and in section;

Fig. 3 is an elevation of a portion of the apparatus shown in Fig. 1 in section on the line 3—3 of Fig. 1; and Fig. 4 is a diagrammatic elevation of alternately usable parts employed to change the manometer range.

The manometer shown in the drawing comprises a housing or body comprising upper and lower chambered parts A and A', respectively, which may be formed of cast iron and are accurately fitted and secured together by suitable dowel pins and bolts. The lower housing body A' is formed with a chamber D for a float C which rests upon the mercury or other manometer sealing liquid. A channel E opening at one end into the lower end of the chamber D terminates at its other end in a vertical enlargement or socket E' which opens at its upper end into a chamber G comprising an enlarged lower portion formed in the part A', and a smaller upper portion formed in the part A. Screwed into the threaded enlargement E' is an externally threaded nipple formed at the bottom of a stand pipe F. The body of the stand pipe F extends into, but does not fill the chamber G. Passages H, H', and $H^2$ provide for the flow of sealing liquid between the passage E and the space in the chamber G surrounding the member F, in the open position of a valve I which controls communication between the passages H' and $H^2$. The lower of the two pressures to be impressed upon the sealing liquid in the manometer is transmitted to the chamber G through a pipe L shown as threaded into a plug closing the upper end of the chamber. The higher pressure is transmitted to the upper end of the chamber D through a pipe K and passages K' and $K^2$ formed in the body part A.

With the manometer construction described, the differential between the pressures transmitted to the upper ends of the chambers D and G by the pipes K and L, respectively, will cause a corresponding displacement between the sealing liquid levels in the manometer leg formed by the chamber D, and in the second manometer leg which is formed by the member F when the valve I is closed, and is formed by the member F and the space in the chamber G surrounding the latter when the valve I is open. The change in sealing liquid level in the chamber D produced by a given pressure differential depends upon the relative horizontal cross section of the two manometer legs, and will be much greater, for example, when the valve I is open, than when the latter is closed. The constant or range of the manometer may be also varied in definite steps by the interchangeable use of one or another of a series of standpipe members F of different predetermined internal diameter, such as those shown in Fig. 4. In order that the range of the manometer with the valve I open may be the same, regardless which of the parts F is then in use, the various parts F should be so proportioned that the sealing liquid displaced by each when the valve I is open will be the same. This means, of course, that the lower portions of a larger member F must have a thinner wall than a part of smaller diameter. In practice the sealing liquid should be brought to the same level in the chambers D and G before closing the valve I, so that the same amount of sealing liquid will always be trapped in the portion of the chamber G surrounding the part F in place when the valve I is closed.

Various arrangements may be employed for measuring, or transmitting to an indicator or regulator the changes in sealing liquid level occurring in the chamber D. The particular means shown for this purpose comprise a magnetic body or core O carried at the upper end of a stem portion of the float C, and vertically movable within a pair of surrounding end to end coils P and P' so that the inductances of the two coils are relatively varied by the movement of the core O as the float C rises and falls. The coils P and P' are mounted on, and the core O is movably received in an extension of the chamber D formed by a tubular part B threaded at its lower end into an opening in the portion of the part A which closes the upper end of the chamber D. As shown, the coils P and P' and a terminal board P² through which the necessary connections to the coils are made, are enclosed in a casing Q of inverted cup-shape which is apertured for the passage of the upper end of the tubular part B and is normally anchored in place against the housing body part A by a nut Q' threaded onto the upper end of the part B. A spring R interposed between the upper end of the coil P and at the top of the casing Q normally holds coils P and P' snugly in place. In practice I prefer to connect the coils P and P' into an impedance bridge of the type disclosed and claimed in Patent 1,743,852, granted January 14, 1930 on my copending application Serial No. 106,346, filed May 3, 1926, as a division of my earlier copending application Serial No. 78,148, filed December 29, 1925, and on which Patent 1,743,853 was granted January 14, 1930. In such impedance bridge a core forming the actuating element of an indicator or recorder is caused to move in correspondence with the movements of the core O, but as such impedance bridge forms no part of the present invention its illustration or further description herein is unnecessary.

In some uses of the manometer the upper portions of the manometer legs above the sealing liquid are normally filled with water. For example, when the manometer is used as a part of a steam flow meter the upper portions of the legs fill with water of condensation. In such cases to prevent oxidation of the core O which otherwise would be in contact with water, the space in the tubular part B not occupied by the core O and float stem may advantageously be filled with a suitable oil which floats on the body of water floating on the sealing liquid and interposed between the latter and the oil. For such use the sealing liquid must be mercury or some other substance heavier than water. With the manometer thus filled with different liquids as the impressed pressure differential varies and the sealing liquid is correspondingly displaced, water flows into or out of the chamber D, and into and out of the chamber G without disturbing the body of oil in the tube B. For its intended use the tubular part B should be non-corrosive non-magnetic material of high electrical resistance which preferably is an alloy consisting of approximately 80% nickel and 20% chromium.

The closure of the upper end of the part B by the removable plug B' facilitates the initial charging and calibration of the manometer. The initial calibration and recalibrations, when necessary, of the manometer are also facilitated by the communication between the chambers D and G provided for through the channels M' and K' when the normally closed valve M (see Fig. 3) is opened. When the valve M is opened the pressures in the upper ends of the two legs of the manometer equalize, so that the same sealing liquid level can then be secured in each leg of the manometer.

Advantageously, the manometer body is made of cast iron or analogous material to insure the necessary strength and cheapness of construction. To minimize corrosion and to practically eliminate fouling resulting from corrosion, otherwise experienced with iron manometers internally exposed to contact with water, steam, corrosive gas, or the like, the float chamber D may advantageously be provided with a lining S of some material which will not be objectionably corroded by the fluids admitted to the chamber D. This lining may be made cheaply and accurately of molded bakelite, or it may be made of a welded tube formed from a sheet of non-corrosive metal such as the alloy consisting of approximately 80% nickel and 20% chromium. The float C also should be made of a suitable non-corrosive material. In some cases the enlarged portion of the chamber G may well be provided with a lining SA formed of the same material as the lining S, and the parts F may also be formed of such non-corrosive material in some cases. The avoidance of corrosion is less important, however, in the case of the chamber G and of the parts F, than in the case of the float chamber, where the fouling which results from corrosion may result in frictional resistance to the float movement. Furthermore, the use of the lining SA is ordinarily made relatively unimportant by the fact that the wall of the chamber G may be unfinished cast iron which is quite highly resistant to corrosion, and by the fact that the volumetric capacity of the enlarged portion of the chamber G is sufficiently great so that appreciable corrosion may occur without material interference with the accuracy of the manometer.

Vertical ribs S' are advantageously formed on the inner wall of the chamber D to prevent the float C from being drawn against the side wall of the chamber D by the surface tension of the mercury or other sealing liquid. With the accurate dimensions readily obtainable with the described construction, very little clearance between the float C and the vertical wall of the float chamber D is required. This reduces the amount of sealing liquid required, and also reduces the tendency of the float to tip and thereby produce frictional engagement of the core O with the tubular part B.

The adjustable range manometer disclosed herein is of special utility for use in carrying out the invention in metering disclosed and claimed in my prior application, Serial No. 126,562, filed August 2, 1926. For such use the different standpipes F should be so proportioned in a uniform relation which may be defined as requiring that the logarithm of the number representing the diameter of any one of the standpipes differs from the logarithm of the number representing the diameter of the next larger or next smaller standpipe by a fractional number of which the numerator is two, and the denominator is more than one in consequence of the mathematical relation thus stated, with a given rise in height of the sealing liquid level in one of the legs of the manometer the logarithms of the numbers representing successive vertical distances between the sealing liquid levels in the two legs existing when the progressively different sized stand-pipes are successively employed differ by the same amount. Features of the manometer including the material of which the tube B is formed and pertaining to the disposition of the coils P and P' surrounding said tube, which are disclosed but are not claimed herein, are claimed in my divisional application Serial No. 218,688, filed September 10, 1927.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. A manometer comprising a body formed with a chamber serving as one manometer leg, and also formed with two other chambers, and means for optionally connecting each or one only of said two other chambers at their lower ends to the lower end of the first mentioned chamber.

2. A manometer comprising an integral body part formed with one chamber constituting one manometer leg and with a second chamber alongside the first mentioned chamber, a passage formed in said body part and connected at one end to the lower end of the first mentioned chamber and formed at its other end with an upwardly extending internally threaded portion at the bottom of said second chamber and a standpipe part which is located in but does not fill said second chamber and which has a threaded lower portion screwed into said internally threaded portion.

3. A manometer comprising a body formed of a main upper part and a main lower part detachably connected together and comprising two manometer leg chambers and formed with a passage in the lower body part connecting said chambers at their lower ends, and formed with a passage in the upper body part connecting the upper ends of said chambers and a valve controlling said last mentioned passage.

4. A manometer comprising a body formed with one chamber constituting one manometer leg and with a second chamber alongside the first mentioned chamber, a passage connected at one end to the lower end of the first mentioned chamber and formed at its other end with an upwardly extending internally threaded portion at the bottom of said second chamber, a standpipe part having a threaded portion adapted to fit said internally threaded portion located within said second chamber but which does not fill the same, and a valved passage connecting the lower end of the first mentioned chamber to the space in said second chamber not filled by said standpipe.

5. A manometer comprising a casing formed with two vertically disposed chambers, a passage smaller in cross section than said chambers connecting the lower ends of the latter, and an aperture at the upper end of one of said chambers, a removable closure for said aperture, and a stand pipe insertible and removable through said aperture, when said closure is removed, and normally secured in said casing and forming an extension of said passage.

Signed at Philadelphia, in the county of Philadelphia, and State of Pennsylvania, this 5th day of August, A. D. 1926.

THOMAS R. HARRISON.